Figure 1:
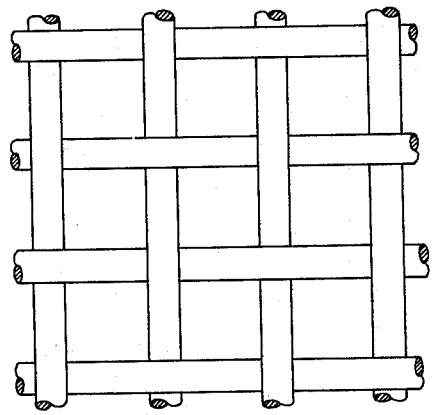
Figure 2:
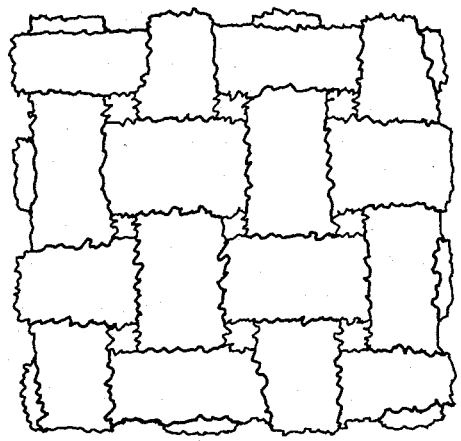
Figure 3:
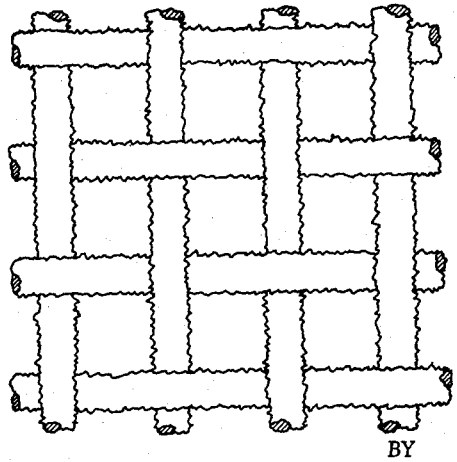

June 11, 1963     O. W. HILL ET AL     3,093,597
REGENERATION OF AMMONIA OXIDATION CATALYST
Filed June 20, 1960

INVENTORS
J.C. THOMAS
O.W. HILL
BY

*ATTORNEYS*

3,093,597
REGENERATION OF AMMONIA OXIDATION CATALYST

Oliver W. Hill, Bartlesville, Okla., and John C. Thomas, Golden, Colo., assignors to Phillips Petroleum Company, a corporation of Delaware
Filed June 20, 1960, Ser. No. 37,283
9 Claims. (Cl. 252—413)

This invention relates to regeneration of an ammonia oxidation catalyst. In one of its aspects, the invention relates to the regeneration of platinum gauze pads used as catalyst in the oxidation of ammonia to produce nitric acid by subjecting said catalyst to ultrasonic vibrations. In another of its aspects, the invention relates to a method as described wherein catalyst fines are removed from beds of catalyst, as herein described, using a combination of steps including one or more of the following: mechanically cleaning the catalyst by brushing and shaking, oxidizing contaminants with a hydrogen torch, treating with hydrochloric acid to remove alloys, iron, etc., treating with hydrogen fluoride to remove sand, silica, etc., treating with sulfuric acid to remove organic matter, etc., but always placing the gauze under circumstances to subject the same to ultrasonic vibration, as in a detergent bath, to dislodge tiny particles, usually platinum, from the catalyst. In a further aspect of the invention, particles which are dislodged can be recovered from the detergent by filtration and the detergent reused. In a further aspect still, the invention relates to the formation of tiny bubbles within the porosities or interstices extant on the catalyst surface when it is to be regenerated, collapsing of the bubbles, the action of detergent or other liquid in a bath which is being used in filling void space dislodging the free particles of catalyst, e.g., platinum, in the catalyst surface or gauze.

The oxidation of ammonia to nitric acid is conveniently carried out using a catalyst containing a metal of the platinum group, viz., platinum, iridium, osmium, palladium, rhodium, and ruthenium. Such catalysts can take the form of woven wire gauzes. A typical gauze pad contains 120 ounces of "platinum catalyst" comprising 90 percent platinum, 5 percent rhodium and 5 percent palladium. The pad is composed of about 16 gauze units made of three to four individual gauzes per unit. The individual gauzes in a unit are woven from wire 75 microns in diameter with 80 meshes per inch and are welded together at the edges. The pads are retained in the converter on a support grid.

A new catalyst gauze of the type described is made of smooth wire. When such a gauze is placed in ammonia oxidation service, metallic protrusions develop on the surfaces of the wire and greatly increase the total surface area of platinum in contact with the reacting gases. As a result, when a new gauze pad is placed in ammonia oxidation service, the initial conversion efficiency of ammonia to nitrogen oxides is very low. Within an hour, however, the conversion efficiency reaches a level of about 90 percent and after about three days, reaches the maximum level of 93 to 96 percent.

An object of the invention is to provide a method for the regeneration of an ammonia oxidation catalyst. Another object of the invention is to provide a method for the regeneration of an ammonia oxidation catalyst employed in the manufacture of nitric acid. A still further object of the invention is to provide a method for the regeneration and/or cleaning of a platinum gauze catalyst.

Other aspects, objects, and the several advantages of the invention are apparent from a study of this disclosure, the drawings and the appended claims.

According to the present invention, there is provided a method for the regeneration of ammonia oxidation catalyst, for example, platinum gauze catalyst, which comprises subjecting the catalyst to an ultrasonic vibration treatment. Preferably, the ultrasonic treatment is accompanied by at least one of the following steps: mechanically cleaning the catalyst or platinum gauze by brushing and/or shaking; reducing the gauze to convert contaminants thereon, as with a hydrogen torch; and treating the gauze in one or more of the following acid baths—hydrochloric acid to remove alloys, iron, etc., hydrofluoric acid to remove sand, silica, etc., sulfuric acid to remove organic matter, etc. Other acids such as nitric, phosphoric and formic may be used. In the ultrasonic vibration step, the gauze is preferably placed in a detergent bath and the ultrasonic energy applied to dislodge tiny particles which in the case of platinum gauze will be particles of platinum which can be subsequently recovered from the detergent by filtration, as well as some contaminant particles.

The invention is primarily concerned with the cleaning of platinum gauze catalysts used in the oxidation of ammonia to prepare nitric acid and, therefore, it will now be described with respect to such utility.

As discussed, new catalyst gauzes develop a conversion efficiency (ammonia to nitrogen oxides) of 93 to 96 percent, normally about 94 percent. After a period of time, the conversion efficiency drops to 90 percent, at which time the catalyst gauze is removed from service and cleaned. When the conventional cleaning steps, hydrogen and acid treatments, are used, the maximum period of service before efficiency drops to 90 percent is about 25 days. Each time a gauze pad is cleaned, it is usually necessary to replace several layers of gauze with new gauze. Losses of catalyst also occur during service in the oxidation process and during cleaning operations. The total loss of catalyst normally averages 0.0374 ounce per ton of nitric acid produced, when conventional cleaning steps are used.

The following examples show results which have been obtained with the invention:

Examples

Five catalyst gauze pads were cleaned by the method of the present invention. The catalyst life, i.e., the time before conversion efficiency dropped to 90 percent, and the total catalyst losses for the five gauze pads are shown below:

| Catalyst life (days) | Catalyst loss (oz./ton of $HNO_3$) |
|---|---|
| 63 | 0.0306 |
| 49 | 0.0343 |
| 38 | 0.0270 |
| 55 | 0.0349 |
| 51 | 0.0315 |

Thus, for the five gauzes treated by the method of this invention, catalyst life increased from the usual 25 days to an average of 51 days. Catalyst loss decreased from the normal 0.0374 to an average of 0.0316 ounce per ton of nitric acid produced. Based on a plant production rate of 400 tons per day, these catalyst savings represent a savings of better than $200.00 per day when the catalyst gauze sells for $87.00 per ounce.

The catalyst life rarely exceeded 25 days before the invention was used.

While it is known in the art to apply sonic vibration to the cleaning of metals generally, it will be noted that the novel treatment of the platinum gauze unexpectedly increased life and reduced cost for use of catalyst per ton.

The unit used for testing was a small generator operating at a frequency of about 40 kilocycles with an energy density of 1.4 watts/cm.$^2$ average power at the transducer, peak power being four times this value. The unit was tested with detergent and water on both unpickled and pickled gauzes. A test on a dirty (unpickled) gauze yielded 10.5 grams of extremely fine dust estimated to be 90 percent or more platinum. Particle sizes were both micron and sub-micron. With the small generator, dust removal (platinum) from pickled gauzes was also obtained.

The removal of this loose material exposes more active catalyst area and thus increases efficiency (1) by reducing pressure drop and (2) by having more area exposed. Reduced losses due to localized heating and more even catalyst usage are additional benefits which result.

Since the treatment of this invention removes platinum particles from the catalyst gauze, it was initially thought that the treatment would remove too many active centers from the catalyst and thus have a detrimental effect on catalyst activity. Therefore, a study of several catalyst gauzes was made under a microscope and typical results are shown in the accompanying drawings.

Referring now to the drawings, FIGURE I shows a section of new gauze having a complete lack of the active centers which are required in the oxidation process mentioned herein. Wire diameters are approximately 75 microns.

FIGURE II is a sketch of a section of dirty gauze removed from an ammonia oxidation unit, showing the free area much reduced by platinum stalagmites, dirt, and other foreign matter. The increase in diameter of the wire has been exaggerated somewhat to indicate the adverse effect of many layers of dirty wire on the flow of gases. The majority of the obstruction is due to platinum, as was shown by examination of particles removed when this section was ultrasonically cleaned according to the invention.

FIGURE III shows a section of gauze treated only by ultrasonics. The majority of the loose or loosely-attached platinum and foreign matter was removed by the cleaning process. The only fluid used was water with a small amount of detergent added for a wetting agent. There appears to be a sufficient quantity of stalagmites remaining to insure activity for conversion and this fact is borne out by the data reported hereinbefore.

From a study of the figures of the drawing thus far described and the data herein, it is evident that ultrasonic vibration provides unexpected improvements not heretofore thought possible.

Regeneration of the gauzes in situ is not now preferred because the converter would be out of service during the cleaning operation and it would be undesirable to introduce the acid and detergent solutions into the converters.

The invention may be practiced with ultrasonic generators that are commercially available. The preferred range of frequency of the ultrasonic vibrations is about 20 to 1000 kilocycles.

Patent 2,740,762, issued April 3, 1956, G. C. Earley, describes a method for reactivation of platinum group metals by the steps of high temperature reduction and treatment with aqueous acid.

Broadly speaking, any reducing gas can be used, but care must be taken that the combination of treatment conditions with a particular gas does not cause undesirable embrittlement of the platinum catalyst. A reducing gas selected from the group consisting of hydrogen, ammonia and carbon monoxide is usually used, and hydrogen is preferred. A convenient hydrogen-containing gas which is often available at the site of a nitric acid plant is ammonia synthesis gas containing only hydrogen and nitrogen. A temperature range of 850 to 900° C. is preferred with the ordinary platinum gauze catalyst used in ammonia oxidation. Some beneficial effect is obtained at temperatures as low as 350° C. but it is preferred that the temperature be at least 750° C. Operation is seldom carried out at temperatures above 950° C. because of increasing embrittlement and volatilization of catalyst components.

After treatment with a reducing gas, the catalyst can be cooled and then treated with an aqueous acid such as hydrofluoric acid, hydrochloric acid, sulfuric acid, nitric acid, phosphoric acid, and/or organic acids, e.g., formic acid. While concentrated acids can be used, it is generally preferred to use comparatively dilute acids since the hydrogen ion activity is greater in dilute acids. While the acid treatment can be carried out at ordinary room temperature, it is preferred to treat the catalyst at atmospheric pressure with the acids under boiling conditions.

While the ultrasonic treatment is preferably carried out in a detergent solution, other media may be used. Such media include organic liquids such as trichloroethylene, carbon tetrachloride, cyclohexane, ethylene glycol and the like. It is also within the scope of the invention to conduct the treatment in air and to use a high power, pneumatic horn to provide the ultrasonic vibrations.

Reasonable variation and modification are possible within the scope of the foregoing disclosure, the drawings and the appended claims to the invention, the essence of which is that ultrasonic vibrations used in the cleaning of a catalyst such as an ammonia oxidation catalyst, more specifically a platinum gauze catalyst, to remove fines therefrom, especially as coupled with a detergent solution and other cleaning steps as described herein, has resulted in improved catalyst life and efficiency.

We claim:

1. A method for the regeneration of an ammonia oxidation catalyst gauze containing a metal of the platinum group to remove solid catalyst particles from the surfaces thereof which comprises subjecting the same to ultrasonic vibrations for a time sufficient to accomplish a desired regeneration.

2. A method according to claim 1 wherein the ultrasonic vibrations are applied to the catalyst immersed in a detergent solution.

3. A method according to claim 2 wherein the catalyst is first mechanically cleaned and then is subjected to treatment with at least one acid selected from the group consisting of hydrofluoric, hydrochloric, sulfuric, nitric, phosphoric and formic acids for a time sufficient to effect the desired cleaning with said acid.

4. A method according to claim 2 wherein the catalyst is subjected to the action of a reducing gas at a temperature of at least 350° C. and below the temperature at which said catalyst becomes embrittled for a time sufficient to effect the desired reduction.

5. A method according to claim 1 wherein the vibrations have a frequency in the approximate range 10–1000 kilocycles.

6. A method according to claim 1 wherein the ultrasonic vibrations are applied to the catalyst immersed in an organic liquid.

7. A method according to claim 1 wherein the ultrasonic vibrations are applied to the catalyst in an air atmosphere.

8. A method for the regeneration of an ammonia oxidation catalyst gauze containing a metal of the platinum group to remove solid catalyst particles from the surface thereof which comprises subjecting the same to ultrasonic vibrations for a time sufficient to accomplish a desired regeneration thereof and then further regenerating said catalyst by subjecting the same to treatment with at least one acid selected from the group consisting of hydrofluoric, hydrochloric, sulfuric, nitric, phosphoric and formic acids for a time sufficient to accomplish the desired further regeneration which these acids can accomplish of the gauze initially treated.

9. A method for the regeneration of an ammonia oxidation catalyst gauze made of platinum and which has been spent in the oxidation of ammonia to nitrogen oxide which comprises removing from said gauze micron and submicron size platinum particles by subjecting the same immersed in a bath of water having a small amount of detergent added for a wetting agent effect to ultrasonic vibrations effective to cause breaking from the surfaces of said gauze of platinum stalagmites thus exposing more active catalyst surface area on said gauze thereby regenerating said gauze.

References Cited in the file of this patent
UNITED STATES PATENTS
2,740,762     Earley ------------------ Apr. 3, 1956
FOREIGN PATENTS
548,960     Great Britain ----------- Oct. 30, 1942